United States Patent
Van Blokland

(10) Patent No.: US 10,925,287 B2
(45) Date of Patent: Feb. 23, 2021

(54) METHOD AND DEVICE FOR PROVIDING A DOUGH PIECE ON A MOVABLE SUBSTRATE

(71) Applicant: Radie B.V., Culemborg (NL)

(72) Inventor: Johannes Josephus Antonius Van Blokland, Laren (NL)

(73) Assignee: RADIE B.V.

( * ) Notice: Subject to any disclaimer, the term of this patent is extended or adjusted under 35 U.S.C. 154(b) by 237 days.

(21) Appl. No.: 16/028,214

(22) Filed: Jul. 5, 2018

(65) Prior Publication Data
US 2019/0008167 A1  Jan. 10, 2019

(30) Foreign Application Priority Data
Jul. 6, 2017 (EP) .................................... 17180025

(51) Int. Cl.
A21C 11/10 (2006.01)
A21C 5/00 (2006.01)
A21C 9/08 (2006.01)

(52) U.S. Cl.
CPC ................ *A21C 11/10* (2013.01); *A21C 5/00* (2013.01); *A21C 9/08* (2013.01)

(58) Field of Classification Search
CPC ....... A21C 11/10; A21C 5/00; B26D 2210/02; B26D 1/56
See application file for complete search history.

(56) References Cited

U.S. PATENT DOCUMENTS 1,288,923 A    12/1918 Klimcow
3,415,206 A *  12/1968 Reisman ................ A21C 11/16
                                              425/311

(Continued)

FOREIGN PATENT DOCUMENTS

GB        2309409 A    7/1997

OTHER PUBLICATIONS

Extended European Search Report for European Patent Application No. 17180025.3, dated Nov. 29, 2017.

*Primary Examiner* — Joseph S Del Sole
*Assistant Examiner* — Jerzi H Moreno Hernandez
(74) *Attorney, Agent, or Firm* — Katten Muchin Rosenman LLP

(57) ABSTRACT

The present invention relates to a device for providing a dough piece on a movable substrate, comprising a substrate, movable in a transport direction for dough pieces with a substrate speed, at least one dough supplier, configured for continuously supplying a dough stream in a supply direction with a supply speed to at least one dispensing opening, arranged above a movable substrate; wherein the plane of the dispensing opening has a directional component perpendicular to the transport direction, a knife, arranged movable with respect to the dispensing opening, with a directional component parallel to the plane of the opening for cutting the dough stream into pieces and a directional component in the supply direction of the dough for moving along with the dough, a controller, for controlling the movement of the knife, and configured to repeatedly move a cutting edge of the knife along the dispensing opening for cutting the dough stream into pieces; and move the knife with a directional component in the supply direction of the dough with at least the dough supply speed, during a predetermined interval directly succeeding a cut.

13 Claims, 5 Drawing Sheets

(56) References Cited

U.S. PATENT DOCUMENTS

Figure 1A:
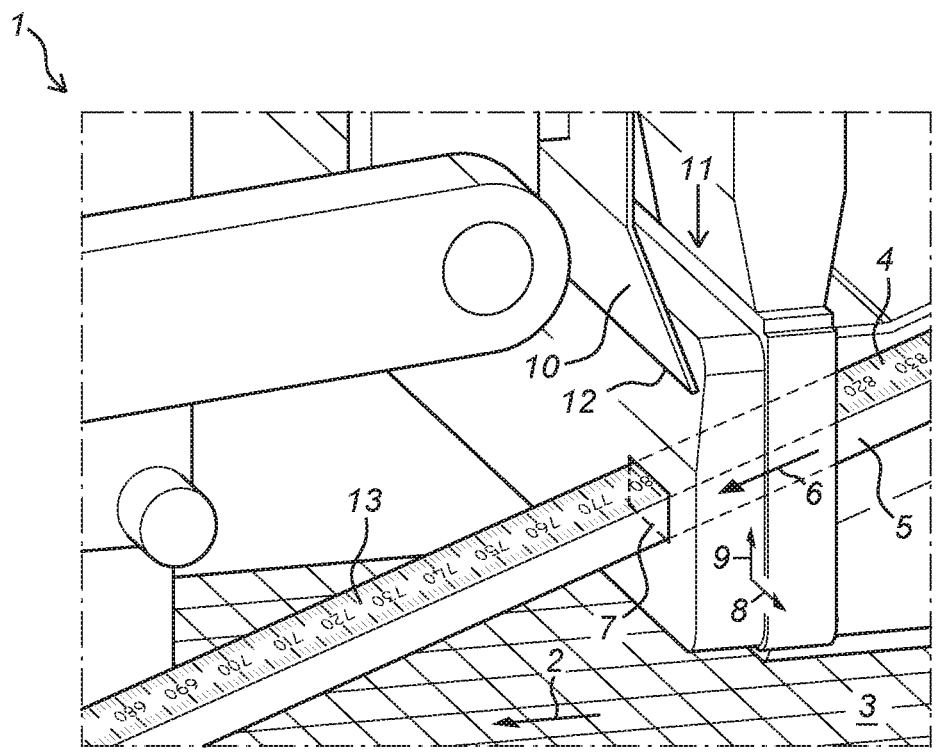

| | | | | |
|---|---|---|---|---|
| 3,782,876 | A * | 1/1974 | Groff | A21C 11/10 |
| | | | | 425/232 |
| 4,332,538 | A | 6/1982 | Campbell | |
| 4,488,464 | A | 12/1984 | Rooke | |
| 4,747,767 | A * | 5/1988 | Schnell | B26D 5/04 |
| | | | | 264/142 |
| 6,561,235 | B2 * | 5/2003 | Finkowski | A21C 9/081 |
| | | | | 141/168 |
| 6,702,805 | B1 * | 3/2004 | Stuart | B25J 9/1065 |
| | | | | 600/102 |
| 2010/0285187 | A1 | 11/2010 | Weinstein et al. | |
| 2018/0125090 | A1 * | 5/2018 | Skoglund | A23G 9/26 |

\* cited by examiner

METHOD AND DEVICE FOR PROVIDING A DOUGH PIECE ON A MOVABLE SUBSTRATE

The present invention relates to a method and device for providing a dough piece on a movable substrate. The invention relates in particular to a device for providing dough pieces on a waffle iron.

Devices of the above mentioned type are known in the art. They usually comprise a dough supplier, which may be formed by a funnel for the dough followed by one or more pairs or rollers, which may—dependent of the dough type used—be toothed rollers. The dough may then be led to a dispensing opening arranged above a substrate, and be cut into pieces that fall onto the substrate.

Due to the sticky dough types that are used for baking waffles, the positioning of the dough pieces on the substrate according to the state of the art shows irregularities. These are partly caused by the adherence of the dough itself to the knife and/or device parts in the vicinity of the dispensing opening, but may also be caused or increased by the high temperatures of the substrate which is formed by the waffle iron and other device parts, of which the temperature may also be high due to irradiation.

When a dough piece touches the moving substrate it may be pulled along with the substrate, and when it also still adheres to the knife, it may be stretched or otherwise be deformed. A further disadvantage caused by the sticking is that the positioning of the various dough pieces on the substrate becomes irregular, causing difficulties in the further processing of the dough pieces or baked waffles, in particular when the dough pieces unintentionally touch or overlap each other.

It is therefor a goal of the present invention to provide a method and device for providing a dough piece on a substrate, taking away the above mentioned disadvantages or at least providing a useful alternative to the state of the art.

The invention thereto proposes a device for providing a dough piece on a movable substrate, comprising a substrate, movable in a transport direction for dough pieces with a substrate speed, at least one dough supplier, configured for continuously supplying a dough stream in a supply direction with a supply speed to at least one dispensing opening, arranged above a movable substrate; wherein the plane of the dispensing opening has a directional component perpendicular to the transport direction, a knife, arranged movable with respect to the dispensing opening, with a directional component parallel to the plane of the opening for cutting the dough stream into pieces and a directional component in the supply direction of the dough for moving along with the dough, a controller, for controlling the movement of the knife, and configured to repeatedly move a cutting edge of the knife along the dispensing opening for cutting the dough stream into pieces and move the knife with a directional component in the supply direction of the dough with at least the dough supply speed, during a predetermined interval directly succeeding a cut.

This interval may be an interval in tie or in distance. The substrate may be formed by a waffle iron, or in particular, a train of waffle irons, that are movable underneath the at least one dispensing opening, wherein they are in an opened position at least in the vicinity of the dispensing opening. The dough supplier may be of a known type, for instance with pairs of rollers, of which there may be at least one pair of toothed rollers. Subsequent pairs of rollers may be configured to rotate in alternate directions for pulling the sticky dough toward the at least one dispensing opening. The opening may have various shapes, round or rectangular for instance, and there may be multiple dispensing openings, for providing dough pieces in several lanes on the substrate. The specific movement of the knife with a directional component in the supply direction of the dough with at least the dough supply speed, during a predetermined interval directly succeeding a cut brings the advantage that the risk of tearing the dough piece is reduced, since the knife moves along with the dough directly after a cut is made, leading to a more regular shape and distribution of the dough pieces. An additional advantage is that the dispensing opening is not blocked by the knife this way, which enables the dough supplier to continuously supply a dough stream in a supply direction since no stagnation is caused by the knife.

The knife may be formed by a wire, but in a preferred embodiment, the knife comprises a blade, wherein at least part of the blade is arranged under an angle with the plane in which the dispensing opening lies in order to limit the area the knife blocks the opening during cutting to the cutting edge of the knife. As a result of this feature, the dough is not hindered and the dough stream is not blocked by the knife during cutting. A knife formed by a blade is to be preferred in particular when dough with additional compounds, like nuts or other solid compounds, is processed.

The supply direction of the dough may be under an angle with the transport direction, in particular between 15 and 25 degrees. The dough thus has a directional component parallel to the transport direction and one towards the substrate, which is further increased by gravity.

The part of the blade of the knife that is arranged under an angle with the dispensing opening may preferably be essentially perpendicular to the supply direction of the dough. Such orientation results in a further decrease of the obstruction of the dough stream by the knife, since the location of the intersection of the knife and the dough stream moves along with the dough stream when the cutting edge of the knife is moved along the plane of the dispensing opening.

In a further embodiment, the controller is configured to limit the directional component of the speed of the knife in the supply direction of the dough to the substrate speed. Herewith it is avoided that the dough gets pushed or compressed from the moment it touches the conveyor.

For being controllably movable in all required directions, the knife may in a practical realization be coupled to a leg of a hingeable parallelogram-shaped suspension which is movable in a vertical plane, wherein an upper corner of an opposite leg is rotatably mounted to a support about a horizontal axis of rotation, and wherein an angular orientation of both legs extending from the axis of rotation are controllable. Preferably, the orientations of both legs are independently controllable.

The substrate speed may in certain cases be externally determined and the controller may then be configured to control at least the supply speed or the movement of the knife in dependence of the substrate speed or changes or fluctuations thereof. As stated above, the substrate may be formed by a movable waffle iron, in particular a train or a carousel-like configuration of waffle irons, wherein the irons comprise two parts that can be clamped together for baking the waffles in between them, and can be opened to receive dough pieces and to discharge baked waffles. Such substrate may be an autonomous system, that is controlled by its own controller or otherwise externally, and that may be configured to provide an signal that indicates its speed or its speed may be measured.

In a further embodiment, a push-off surface is arranged at such distance from the dispensing opening that the knife is allowed to move in between the dispensing opening and the push-off surface, and wherein the push-off surface is further arranged such that the dough stream can pass underneath the push-off surface.

The push-off surface acts to remove the dough from the knife in case it sticks thereto. Sticking of the dough to the knife may cause irregularities in the shape of the dough pieces, since they can be stretched, and/or the position of the dough pieces on the surface. This push-off surface may be formed by a cord, a string, a rod or a plate for instance.

The controller may be configured to move the knife repeatedly along a path wherein the cutting edge passes the dispensing opening in a direction with at least a downwardly oriented direction, wherein the knife subsequently follows the direction of the dough, and wherein the knife finally moves with at least an upwardly oriented direction, wherein the knife passes the push-off surface for detaching any dough piece sticking to the knife. Preferably this is a smooth path without sharp edges, and preferably the movements themselves are also smooth, in particular without stops in between. This not only reduces noise, vibrations and wear of the device, but also helps avoiding stagnations in the dough flow.

The dispensing opening may be arranged in an exchangeable part of the device, so that various forms of openings can be used, for instance round and rectangular ones.

The invention also relates to a method for providing a dough piece on a movable substrate, comprising: moving a substrate in a transport direction with a substrate speed; continuously supplying a dough stream in a supply direction with a supply speed to at least one dispensing opening, arranged above the movable substrate; repeatedly moving a cutting edge of a knife along the dispensing opening for cutting the dough stream into pieces; and moving the knife with a directional component in the supply direction of the dough with at least the dough supply speed, during a predetermined interval directly succeeding a cut.

The invention further relates to a method comprising moving the knife repeatedly along a path wherein the cutting edge passes the dispensing opening in a direction with at least a downwardly oriented direction, wherein the knife subsequently follows the direction of the dough, and wherein the knife finally moves with at least an upwardly oriented direction, wherein the knife passes a push-off surface for detaching any dough piece sticking to the knife.

Figure 2:
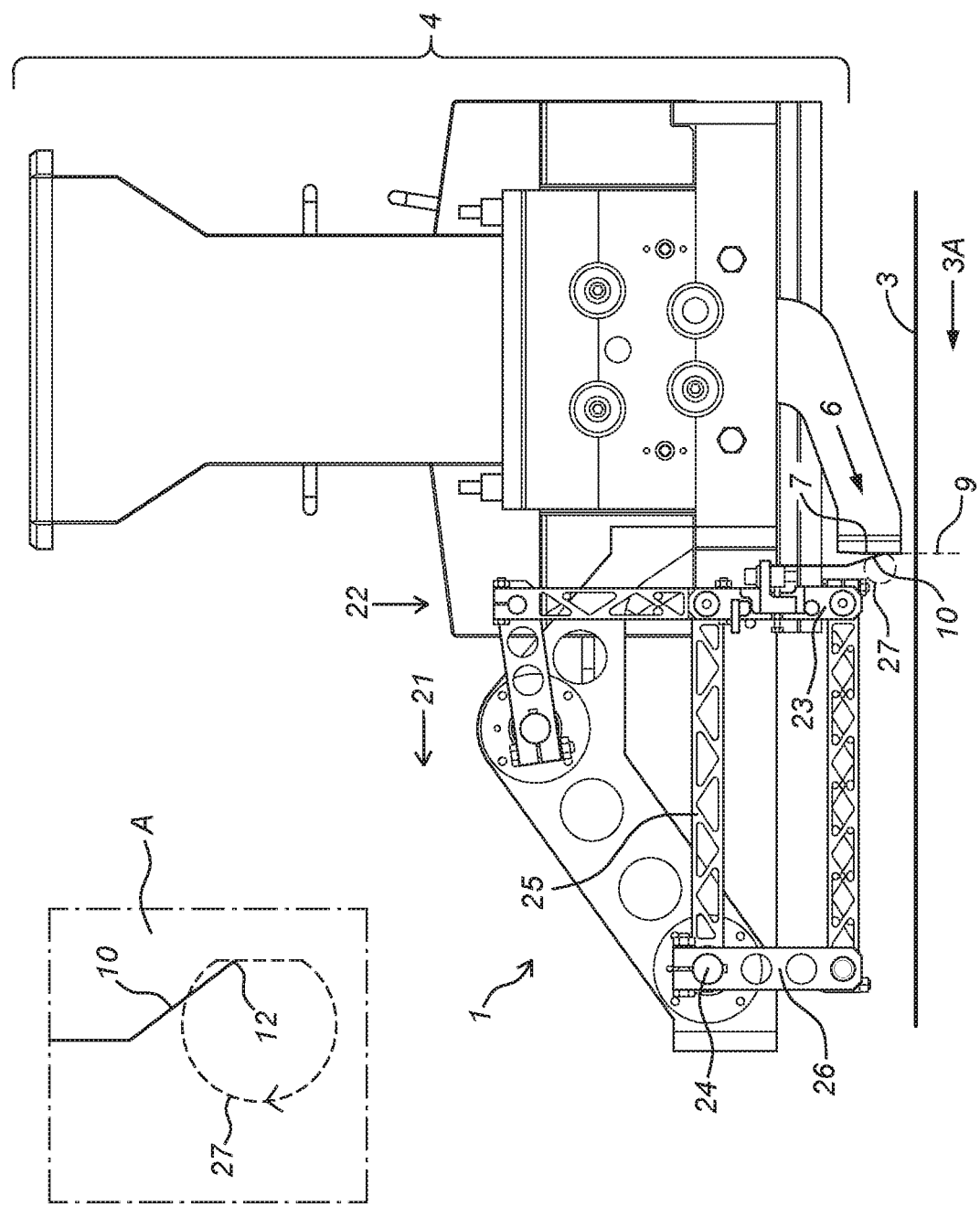

The invention will now be elucidated into more detail with reference to the following figures. Herein:

FIGS. 1a-h show a device according to the present invention during various moments of a operation cycle;

FIG. 2 shows a schematic side view of a device according to the present invention.

FIGS. 1a-h show a device 1 for providing a dough piece on a movable substrate 3 in various states as will be explained later on. The device comprises a substrate 3 movable in a transport direction 2 for dough pieces with a substrate speed, at least one dough supplier 4, configured for continuously supplying a dough stream 5 in a supply direction 6 with a supply speed to at least one dispensing opening 7, arranged above the movable substrate 3 wherein the plane 8, 9 of the dispensing opening 7 has a directional component perpendicular to the transport direction 2, a knife 10, arranged movable with respect to the dispensing opening 7, with a directional component 11 parallel to the plane of the opening for cutting the dough stream into pieces and a directional component in the supply direction 6 of the dough 5 for moving along with the dough 5.

A controller (not depicted in the drawings) is configured to repeatedly move a cutting edge 12 of the knife along the dispensing opening 7 for cutting the dough stream into pieces and move the knife with a directional component in the supply direction 6 of the dough with at least the dough supply speed, during a predetermined interval directly succeeding a cut.

In the drawing, an imaginary ruler 13 is depicted, as an aid to explain the movement of the knife 10 with respect to the dough stream 6. The dough supplier may be of a known type, for instance with pairs of rollers, of which there may be at least one pair of toothed rollers. Subsequent pairs of rollers may be configured to rotate in alternate directions for pulling the sticky dough toward the at least one dispensing opening. The opening 7 may have various shapes, round or rectangular as it is depicted for instance, and there may also be multiple dispensing openings 7, for providing dough pieces in several lanes on the substrate 3.

FIG. 1a may for instance be considered as an initial position. The cutting edge 12 of the knife 10 is arranged above the dispensing opening 7 and thus also above the dough stream 4. In the following figures, the same reference numbers indicate the same parts. Reference numbers are indicated where the description explicitly mentions the corresponding part.

Figure 1B:
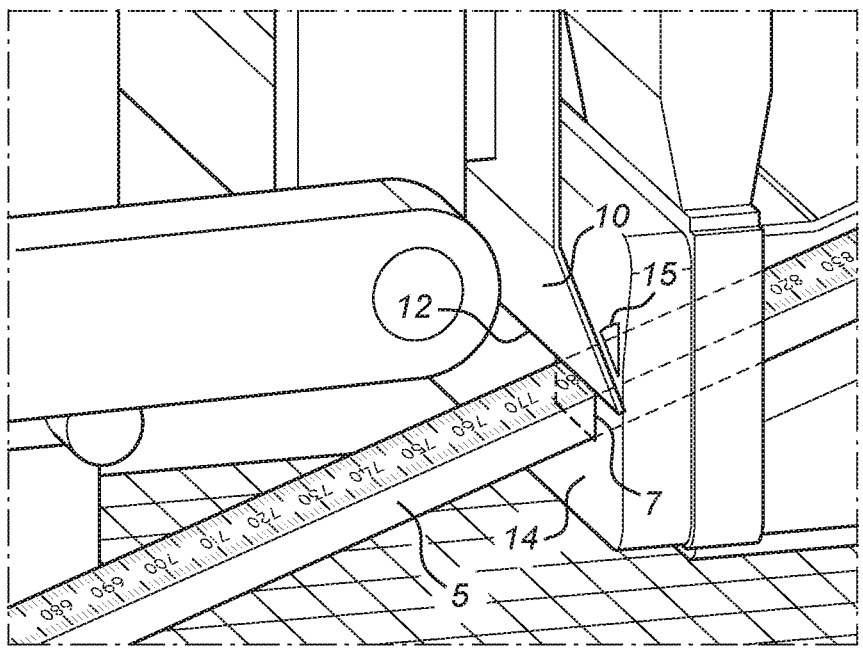

FIG. 1b shows how the knife is moved to a next position, where the cutting edge of the knife 10 is arranged just above the dispensing opening 7, and thus also just above the dough stream 5. The cutting edge 12 is in the plane 14 of the part wherein the dispensing opening 7 is made and thus also in the plane of the dispensing opening 7 itself. Although not necessary, this may be preferred for obtaining a sharp cut. As it can be seen in the figure, the knife 10 comprises a blade, that is under an angle 15 with the plane 14. This angle is preferably adapted to the speed of the knife 10 in downward direction and to the speed of the dough supplied from the dispensing opening such that the intersection of the knife and the dough moves along with the dough during cutting. In other words, the part of the knife that is in touch with the dough, moves along with the dough. Hereby, no friction is exerted to the dough 5 in the direction of movement 6, and the dough is neither pushed, nor blocked by the knife 10.

Figure 1C:
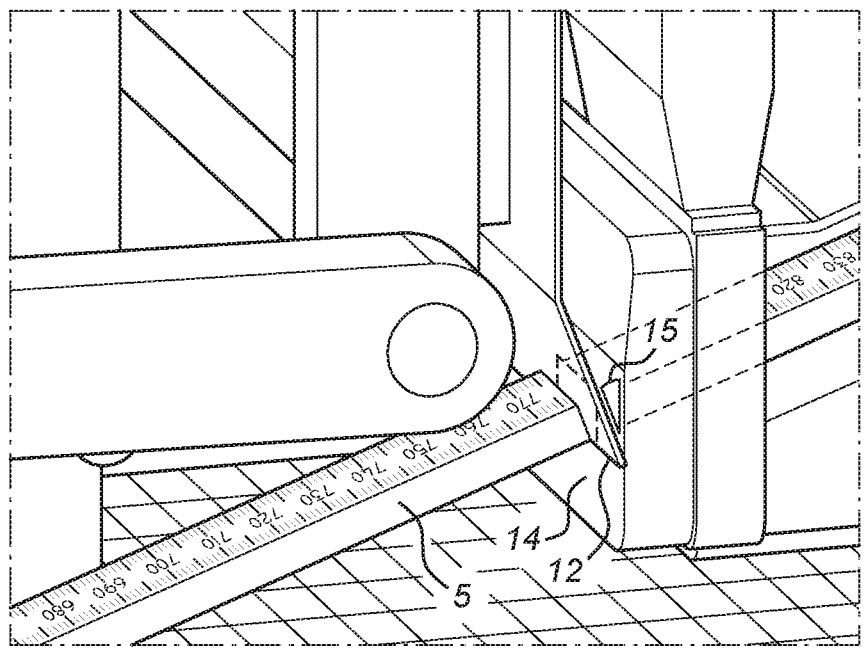

FIG. 1c shows a position that is obtained by moving the knife 10 as a whole in a downward direction from the previous position depicted in FIG. 1b. The movement does not necessarily need to be parallel with the plane 14 of the part wherein the dispensing opening 7 is made but it is preferred that at least the cutting edge 12 of the knife 10 remains in the plane 14 of the part wherein the dispensing opening 7 is made. As it can be seen by comparing FIGS. 1b and 1c, the angle 15 under which the knife 10 intersects the dough 5 is kept constant, and as one can read from the virtual ruler, the intersection of the knife 10 and the dough 5 moves along with the dough 5.

Figure 1D:
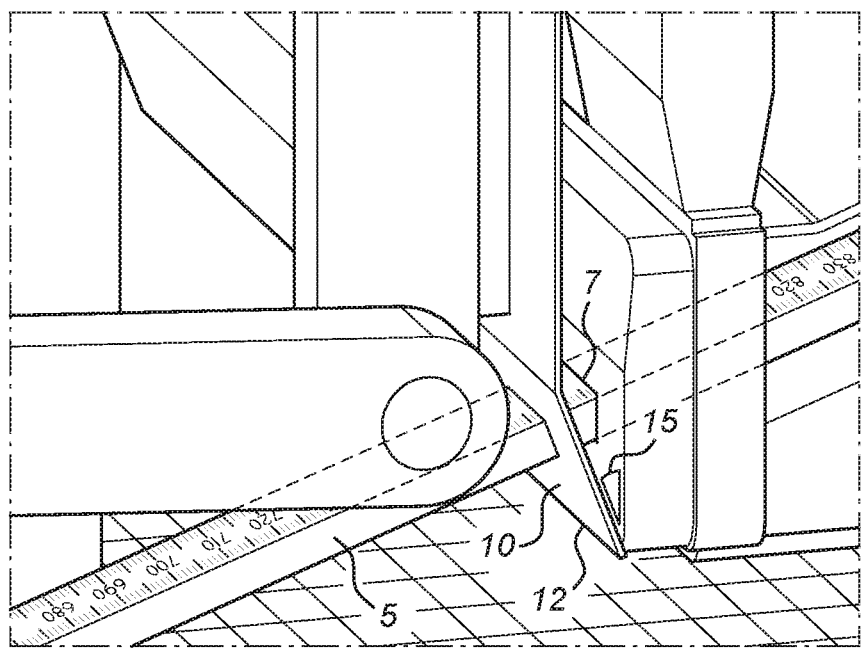

FIG. 1d shows that this remains the same as the knife 10 moves further downward. The downward movement needs to be at least to such extend that the cutting edge 12 of the knife 10 moves along the entire dispensing opening 7 in order to fully cut the dough 5.

Figure 1E:
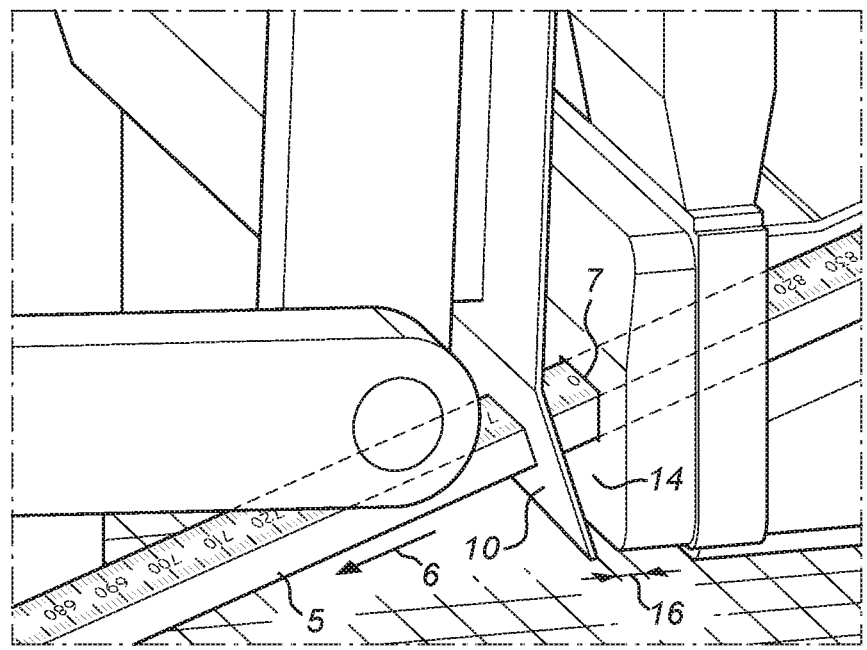

FIG. 1e shows that when the dough 5 moves further in its supply direction 6, the knife moves along with the dough over a distance 16, without further moving downward.

Figure 1F:
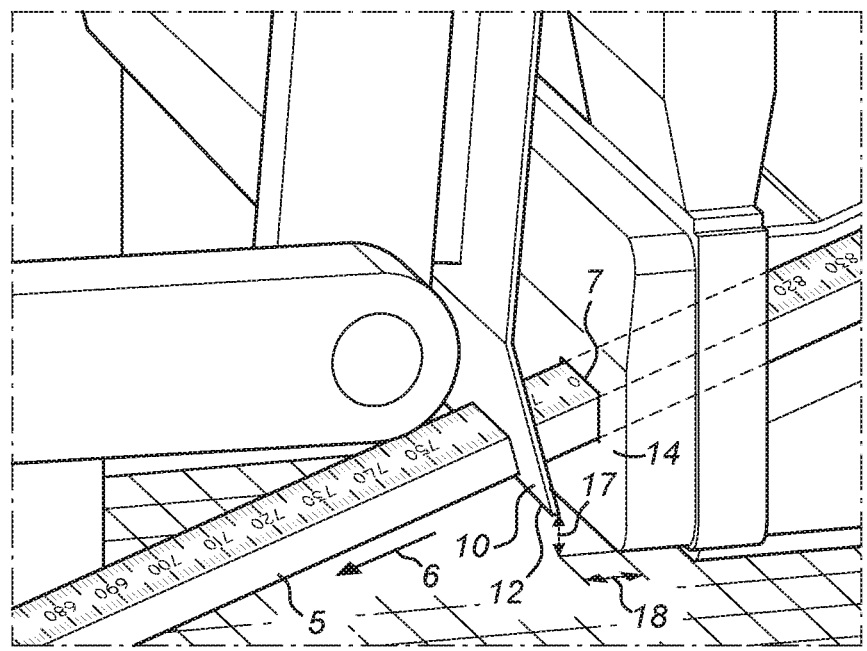

FIG. 1f shows that the distance 16 increases to distance 18 as the knife 10 is retracted from the dough 5 over a distance 17. The cutting edge 12 of the knife is now equal again to the lower side of the dough 5. In the drawing, the dough is depicted in the hypothetic case wherein it follows its path in the direction 6. Normally, a leading edge of a dough piece may fall onto the substrate 3 however. The lagging edge, at the cut, may fall too, but depending on the stickiness of the dough, it may also remain adhered to the knife.

Figure 1G:
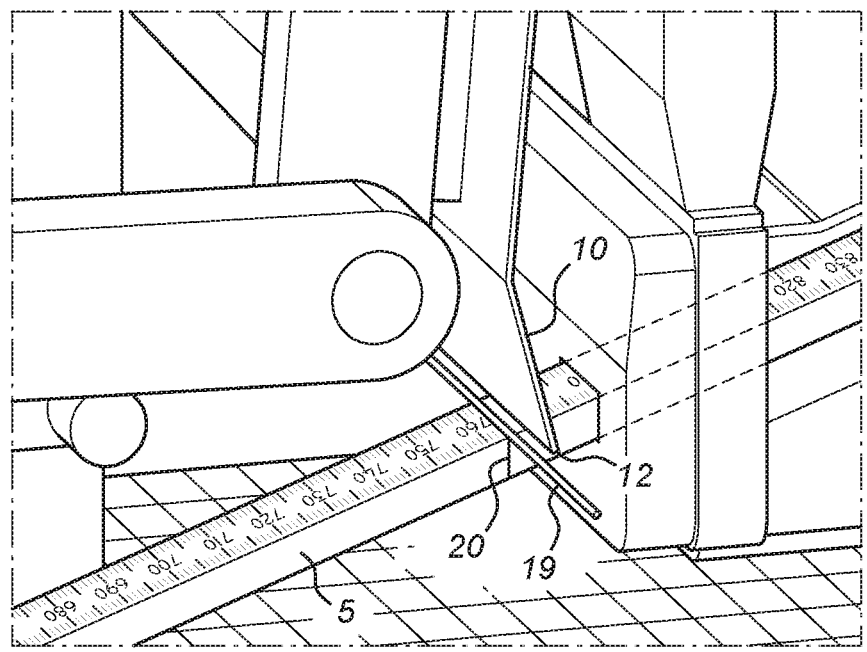

FIG. 1g shows the knife 10, fully retracted from the dough 5. For preventing dough to be lifted with the knife, an optional push-off surface 19 is shown here. The push-off surface, formed by a cord or rod here, limits the dough to a maximal height. Herewith, it cannot follow the entire retraction movement of the knife.

Figure 1H:
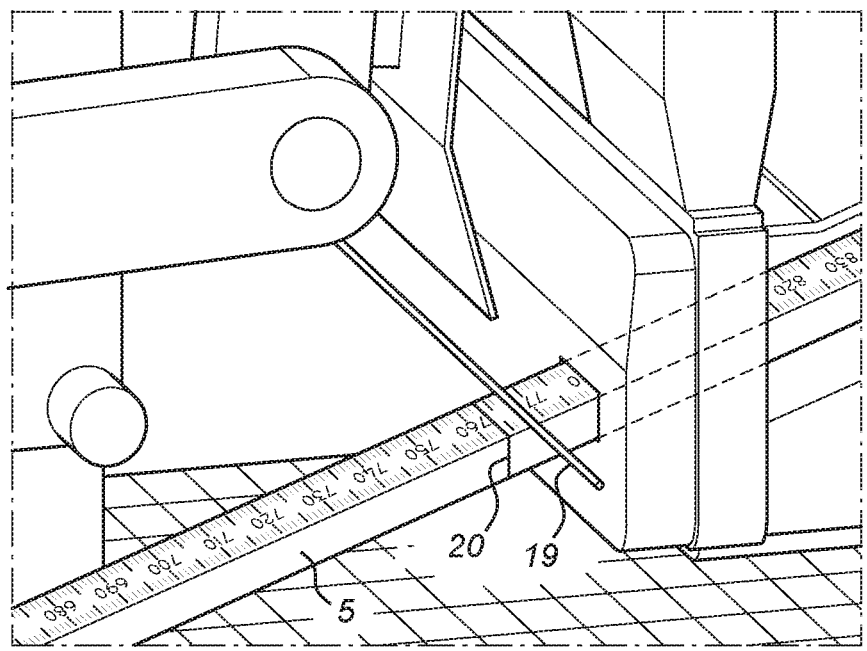

FIG. 1h shows the knife fully retracted from the dough 5.

FIG. 2 shows a practical embodiment of a device for providing a dough piece on a movable substrate 3 according to the present invention, comprising a substrate 3, movable in a transport direction 3A for dough pieces with a substrate speed and a dough supplier 4, configured for continuously supplying a dough stream in a supply direction with a supply speed to at least one dispensing opening 7, arranged above the movable substrate 3; wherein the plane of the dispensing opening has a directional component 9 perpendicular to the transport direction 3A. The device further has a knife 10, arranged movable with respect to the dispensing opening 7, with a directional component 22 parallel to the plane of the opening for cutting the dough stream into pieces and a directional component 21 in the supply direction of the dough for moving along with the dough. The knife is coupled to a leg 23 of a hingeable parallelogram-shaped suspension which is movable in a vertical plane, wherein an upper corner of an opposite leg is rotatably mounted to a support about a horizontal axis of rotation 24, and wherein an angular orientation of both legs 25, 26 extending from the axis of rotation are controllable. The knife and in particular a cutting edge thereof is therewith movable along a path 27, which is for instance essentially a knotted circular path, as depicted larger in detailed view A.

The examples given above are exemplary only and serve by no means to limit the scope of protection as defined by the following claims.

The invention claimed is:

1. A device for providing a dough piece on a movable substrate, comprising:
    a substrate, movable in a transport direction for conveying dough pieces with a substrate speed;
    at least one dough supplier, configured for continuously supplying a dough stream in a supply direction with a supply speed to at least one dispensing opening, arranged above the substrate; wherein the plane of the dispensing opening has a directional component perpendicular to the transport direction;
    a knife;
    a hingeable parallelogram-shaped suspension comprising legs, wherein the knife is coupled to a leg of the hingeable parallelogram-shaped suspension which is movable in a vertical plane, wherein an upper corner of an opposite leg is rotatably mounted to a support about a horizontal axis of rotation, wherein another leg connects the leg to the opposite leg, and
    a controller configured to:
        control movement of the leg in the vertical plane to move a cutting edge of the knife from a starting position along the dispensing opening for cutting the dough stream into pieces;
        control rotation of the opposite leg about the horizontal axis of rotation to move the knife to the starting position in a circular path after a cut, wherein the circular path has a directional component that is parallel to the supply direction of the dough and moves the knife with a speed equivalent to at least the dough supply speed during a predetermined interval directly succeeding the cut; and
        control the movement of the leg in the vertical plane independently from the rotation of the opposite leg about the horizontal axis of rotation.

2. The device according to claim 1, wherein the knife comprises a blade, wherein at least part of the blade is arranged under an angle with the dispensing opening in order to limit the area the knife blocks the dispensing opening during cutting.

3. The device according to claim 1, wherein the supply direction of the dough is under an angle with the transport direction, wherein the angle is between 15 and 25 degrees.

4. The device according to claim 2, wherein the part of the blade arranged under an angle with the dispensing opening is essentially perpendicular to the supply direction of the dough.

5. The device according to claim 1, wherein the controller is configured to limit the speed of the knife in the directional component that is parallel to the supply direction of the dough to a speed equivalent to the substrate speed.

6. The device according to claim 1, wherein the substrate speed is externally determined and the controller is configured to control the supply speed and/or the movement of the knife in dependence of the substrate speed or changes or fluctuations thereof.

7. The device according to claim 1, wherein a push-off surface is arranged at such distance from the dispensing opening that the knife is allowed to move in between the dispensing opening and the push-off surface, and wherein the push-off surface is further arranged such that the dough stream can pass underneath the push-off surface.

8. The device according to claim 7, wherein the push-off surface is formed by a cord, a string, a rod or a plate.

9. The device according to claim 8, wherein the controller is configured to move the knife repeatedly along a path wherein the cutting edge passes the dispensing opening in a direction with at least a downwardly oriented direction, wherein the knife subsequently follows the direction of the dough, and wherein the knife finally moves with at least an upwardly oriented direction, wherein the knife passes the push-off surface for detaching any dough piece sticking to the knife.

10. The device according to claim 9, wherein the controller is configured to move the knife along a smooth path.

11. The device according to claim 1, wherein the dispensing opening is arranged in an exchangeable part of the device.

12. The device according to claim 7, wherein the knife comprises a blade, wherein at least part of the blade is arranged under an angle with the dispensing opening in order to limit the area the knife blocks the dispensing opening during cutting.

13. The device according to claim 12, wherein the part of the blade arranged under an angle with the dispensing opening is essentially perpendicular to the supply direction of the dough.

* * * * *